United States Patent
Newlin et al.

(10) Patent No.: US 10,775,796 B2
(45) Date of Patent: Sep. 15, 2020

(54) AERIAL VEHICLE SYSTEMS AND METHODS

(71) Applicant: CNH Industrial America LLC, New Holland, PA (US)

(72) Inventors: Timothy Aaron Newlin, Wichita, KS (US); Tyler Wade Demel, Wichita, KS (US); Jeremy Robert Mirarck, Wichita, KS (US); Paul Francis Szurpicki, Colwich, KS (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/402,832

(22) Filed: Jan. 10, 2017

(65) Prior Publication Data
US 2018/0196438 A1 Jul. 12, 2018

(51) Int. Cl.
| *G05D 1/02* | (2020.01) |
| *G05D 1/00* | (2006.01) |
| *G05D 1/10* | (2006.01) |
| *G01C 21/20* | (2006.01) |
| *B64D 47/08* | (2006.01) |

(Continued)

(52) U.S. Cl.
CPC ......... *G05D 1/0214* (2013.01); *B64C 39/024* (2013.01); *B64D 47/08* (2013.01); *G01C 21/20* (2013.01); *G03B 15/006* (2013.01); *G05D 1/0016* (2013.01); *G05D 1/0022* (2013.01); *G05D 1/0033* (2013.01); *G05D 1/0038* (2013.01); *G05D 1/0088* (2013.01); *G05D 1/0094* (2013.01); *G05D 1/101* (2013.01); *B64C 2201/127* (2013.01); *B64C 2201/146* (2013.01); *E02F 9/261* (2013.01);
(Continued)

(58) Field of Classification Search
CPC .. G05D 1/0214; G05D 1/0016; G05D 1/0022; G05D 1/0033; G05D 1/0088; G05D 1/101; G05D 2201/0201; G05D 2201/0202; G05D 2201/0209; G05D 1/0038; G05D 1/0094; B64C 39/024; B64C 2201/127; B64C 2201/146; B64D 47/08; G01C 21/20; G03B 15/006; E02F 9/261
USPC ........................................................... 701/2
See application file for complete search history.

(56) References Cited

U.S. PATENT DOCUMENTS

| 4,006,481 A * | 2/1977 | Young ..................... E02F 9/245 |
| | | 343/770 |
| 8,099,218 B2 | 1/2012 | Glee et al. |

(Continued)

FOREIGN PATENT DOCUMENTS

| DE | 102011106170 A1 | 2/2012 |
| DE | 102014218749 A1 | 3/2016 |

(Continued)

OTHER PUBLICATIONS

European Search Report for European Application No. 18150854.0, dated May 30, 2018 (8 pages).

*Primary Examiner* — Paula L Schneider
(74) *Attorney, Agent, or Firm* — Peter Zacharias; Patrick Sheldrake

(57) ABSTRACT

A system includes a first aerial vehicle comprising one or more sensors configured to obtain an image of a worksite. The system also includes a controller configured to receive the image of the worksite, to generate a map of the worksite by overlaying information related to the worksite on the image, and to display the map via a display.

18 Claims, 5 Drawing Sheets

(51) Int. Cl.
  *G03B 15/00*    (2006.01)
  *B64C 39/02*    (2006.01)
  *E02F 9/26*     (2006.01)
(52) U.S. Cl.
  CPC .............. *G05D 2201/0201* (2013.01); *G05D 2201/0202* (2013.01); *G05D 2201/0209* (2013.01)

(56) References Cited

U.S. PATENT DOCUMENTS

| | | | |
|---|---|---|---|
| 2010/0107925 A1 | 5/2010 | Bounds | |
| 2011/0090399 A1* | 4/2011 | Whitaker | H04N 21/4307 348/500 |
| 2011/0131081 A1* | 6/2011 | Nielsen | G06Q 10/00 705/7.42 |
| 2012/0029732 A1 | 2/2012 | Meyer | |
| 2014/0184643 A1* | 7/2014 | Friend | G09G 3/003 345/633 |
| 2014/0303814 A1 | 10/2014 | Burema et al. | |
| 2016/0358432 A1* | 12/2016 | Branscomb | G08B 13/1965 |
| 2016/0363932 A1* | 12/2016 | Moriarity | B64C 39/024 |
| 2017/0031365 A1* | 2/2017 | Sugumaran | B64C 39/024 |
| 2017/0131717 A1* | 5/2017 | Kugelmass | G05D 1/101 |

FOREIGN PATENT DOCUMENTS

| | | |
|---|---|---|
| GB | 2312056 A | 10/1997 |
| GB | 2533140 A | 6/2016 |
| WO | 2015067797 A1 | 5/2015 |
| WO | 2016065519 A1 | 5/2016 |

\* cited by examiner

AERIAL VEHICLE SYSTEMS AND METHODS

BACKGROUND

The disclosure relates generally to systems and methods configured to obtain and to provide information about a worksite, and more particularly, to systems and methods including an aerial vehicle for use with work vehicles.

Certain work vehicles (e.g., bulldozers, front loaders, skid steers, tractors, harvesters, etc.) may be operated at worksites (e.g., construction sites or agricultural fields) that have a variety of obstacles and other terrain features. For example, a work vehicle may be operated to dig a trench in the vicinity of trees, boundaries (e.g., fences), buildings, other work vehicles, and so on. Generally, an operator of the work vehicle may control the work vehicle to follow certain paths and to avoid certain terrain features. However, the operator may have limited visibility of terrain features surrounding the work vehicle, which may result in reduced operational efficiency, for example.

BRIEF DESCRIPTION

Certain embodiments commensurate in scope with the present disclosure are summarized below. These embodiments are not intended to limit the scope of the claims, but rather these embodiments are intended only to provide a brief summary of possible forms of the system and/or methods disclosed herein. Indeed, the systems and/or methods may encompass a variety of forms that may be similar to or different from the embodiments set forth below.

A first embodiment includes a first aerial vehicle comprising one or more sensors configured to obtain an image of a worksite. The system also includes a controller configured to receive the image of the worksite, to generate a map of the worksite by overlaying information related to the worksite on the image, and to display the map via a display.

A second embodiment includes a non-transitory computer-readable medium comprising instructions that when executed by a processor cause the processor to receive data indicative of a feature of a worksite from a monitoring vehicle and to block movement of a tool of a work vehicle based on the data received from the aerial vehicle.

A third embodiment includes a method that includes receiving, at a processor, data obtained by one or more sensors of an aerial vehicle as the aerial vehicle hovers over a worksite. The method also includes generating, using the processor, a map of the worksite using the data, wherein the map comprises an image overlaid with information related to the worksite. The method further includes instructing, using the processor, a display to provide the map on a screen of the display within a work vehicle.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
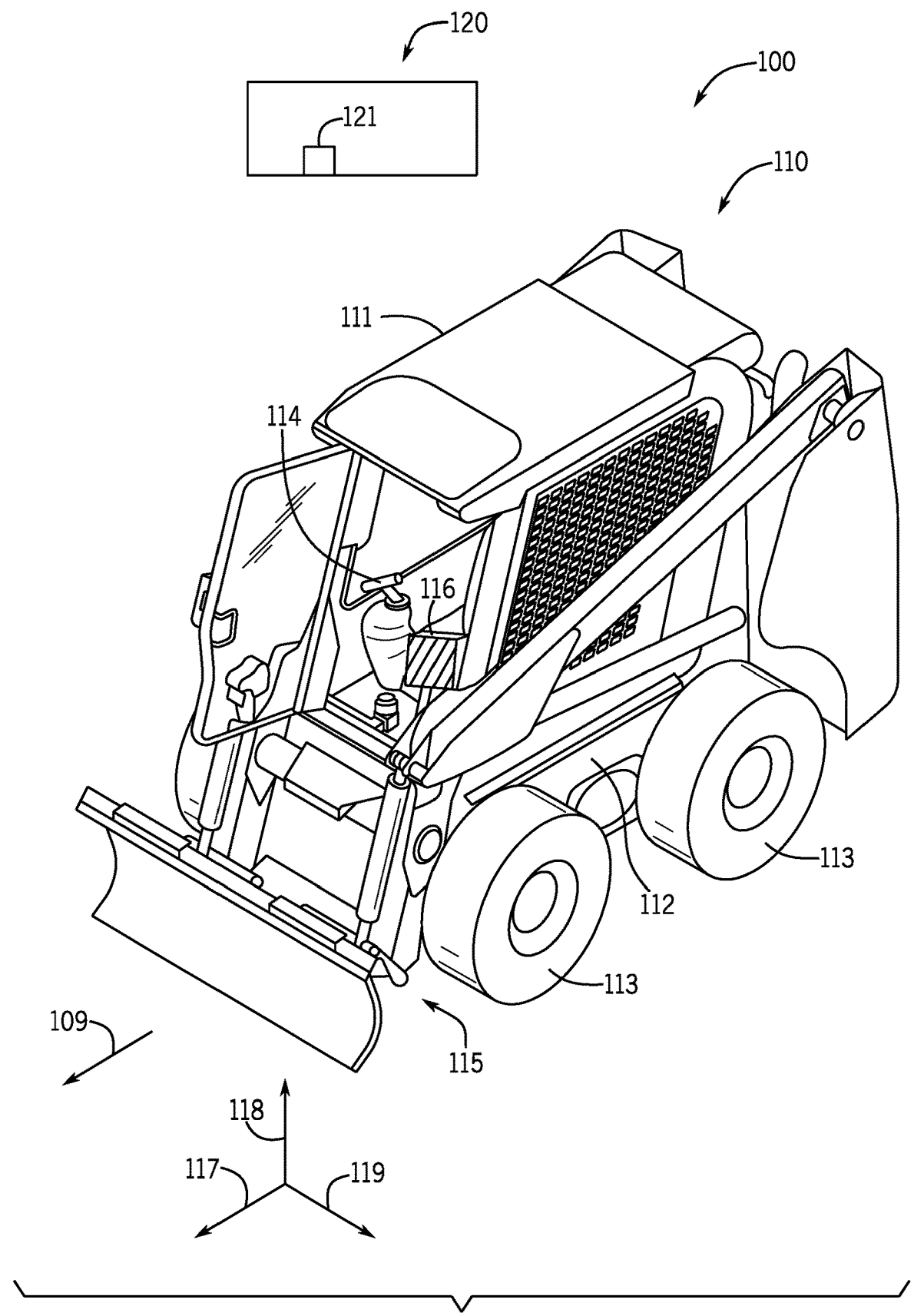
FIG. 1 is a perspective view of a system having a work vehicle and an aerial vehicle, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Work vehicles, such as construction vehicles (e.g., bulldozers, front loaders, skid steers, etc.) or agricultural vehicles (e.g., tractors, harvesters, etc.), may move about and carry out operations at a worksite (e.g., construction site or agricultural field). For example, construction vehicles may move about a construction site to dig trenches, level ground, move objects, or the like. An operator may sit in an operator cab and control the work vehicle based on the operator's visual observation of surrounding terrain features. However, visibility of surrounding terrain features may be limited. The present disclosure relates to systems and methods that utilize a monitoring vehicle, such as an aerial vehicle (e.g., drone, unmanned aerial vehicle, or remotely operated aerial vehicle), that is configured to obtain and to provide information (e.g., surface images, sensor data, or the like) about the worksite. For example, the aerial vehicle may hover above the work vehicle and may provide an image (e.g., still photo or a video) of the worksite, such as a portion of the worksite at which a tool (e.g., attached tool or implement) of the work vehicle is being used to dig a trench or complete some other work task. The aerial vehicle may provide substantially real-time information, including relatively high-resolution images or maps (e.g., as compared to satellite images), as the aerial vehicle and/or the work vehicle travel about the worksite, thereby improving operator visibility, as well as improving operational efficiency and accuracy.

To facilitate clarity, the present disclosure is described primarily in relation to the construction context. However, it should be appreciated the techniques described in the present disclosure are not limited to the construction context. In fact, the techniques described in the present disclosure may be implemented in any suitable context involving coordinating, monitoring, and/or controlling operation of multiple vehicles, such as an agricultural context utilizing multiple agricultural vehicles, a consumer context utilizing multiple consumer vehicles, a public transportation context utilizing multiple transportation vehicles, and/or a military deployment context utilizing multiple military vehicles.

Turning now to the figures, FIG. 1 is a perspective view of an embodiment of a system 100 (e.g., a monitoring system or an aerial vehicle system) that includes a work vehicle 110 and an aerial vehicle 120. In the illustrated embodiment, the work vehicle 110 is a skid steer. However, it should be appreciated that the work vehicle 110 disclosed herein may be any type of work vehicle, such as but not limited to on-road trucks, off-road vehicles, bull dozers, front loaders, tractors, harvesters, or the like. In the illustrated embodiment, the work vehicle 110 includes a cab 111 and a chassis 112. In certain embodiments, the chassis 112 is configured to house a motor (e.g., diesel engine, etc.), a hydraulic system (e.g., including a pump, valves, reservoir, etc.), and other components (e.g., an electrical system, a cooling system, etc.) that facilitate operation of the work vehicle 110. In addition, the chassis 112 is configured to support the cab 111 and wheels 113. The wheels 113 may be driven to rotate by the motor and/or by component(s) of the hydraulic system (e.g., hydraulic motor(s), etc.). While the illustrated work vehicle 110 includes wheels 113, it should be appreciated that in alternative embodiments, the work vehicle may include tracks or a combination of wheels and tracks.

The cab 111 is configured to house an operator of the work vehicle 110. Accordingly, the work vehicle 110 includes an operator interface 116 (e.g., having a display, speaker, and/or inputs, such as buttons or switches) positioned within the cab 111 to provide information to the operator and/or to facilitate operator control of the work vehicle 110. In some embodiments, various other inputs, such as the illustrated joystick 114, may be positioned within the cab 111 to facilitate operator control of the work vehicle 110. For example, the inputs may enable the operator to control rotational speed of the wheels 113, thereby facilitating adjustment the speed and/or direction of the work vehicle 110. In addition, the controls may facilitate operator control of an attachment tool 115 (e.g., implement). While the illustrated work vehicle 110 includes a blade as the attachment tool 115, it should be appreciated that in alternative embodiments, the work vehicle 110 may include a bucket, a ripper assembly, a tilling assembly, or a gripper assembly, among other attachments. To facilitate discussion, the work vehicle 110 may be described with reference to a forward direction of travel 109, a longitudinal axis or direction 117, a vertical axis or direction 118, and a lateral axis or direction 119.

As shown, the system 100 also includes the aerial vehicle 120. The aerial vehicle 120 may be autonomously controlled (e.g., self-controlled via programmed settings) and/or remotely controlled, such as via operator input at the operator interface 116 of the work vehicle 110 or via operator input at a remote base station, for example. In some embodiments, the aerial vehicle 120 may support one or more sensors 121 (e.g., cameras, acoustic sensors, optical sensors, moisture sensors, thermal sensors, wind speed sensors, or the like) that are configured to monitor and to obtain data (e.g., images and/or data related to obstacles, moisture content of the soil, humidity, temperature, wind speed, or the like) associated with the work vehicle 110 and/or the area surrounding the work vehicle 110.

As discussed in more detail below, the aerial vehicle 120 may be configured to move about the worksite and/or to hover over the work vehicle 110 (e.g., at a fixed position relative to a reference point of the work vehicle 110) to obtain the data, which may be communicated (e.g., wirelessly communicated) to and output via the operator interface 116, thereby enhancing the operator's visibility and knowledge of the worksite, for example. In some embodiments, the data obtained by the aerial vehicle 120 may be utilized (e.g., by a controller, which may be located at the work vehicle 110 or a remote base station) to generate and/or to update a map of the worksite showing an image overlaid with various data (e.g., underground obstacles) obtained by the aerial vehicle 120 and other information (e.g., previously obtained information, stored information, operator input information), such as topography, designated work areas (e.g., dump areas, fill areas, dig areas, foundation areas or planned building footprint, work area for each work vehicle 110, etc.), utility lines (e.g., underground and above-ground utility lines), boundaries (e.g., from a land survey, etc.), agricultural crop yield maps, or the like. In some embodiments, the data obtained by the aerial vehicle 120 may be utilized (e.g., by the controller) to provide alarms (e.g., visual or audible alarms), such as if the work vehicle 110 approaches an obstacle identified based on the data obtained by the aerial vehicle 120. In some embodiments, the data obtained by the aerial vehicle 120 may be utilized (e.g., by the controller and/or by the operator) to the control the work vehicle 110 (e.g., the ground speed, steering, the tool 115, or the like).

Although one work vehicle 110 and one aerial vehicle 120 are shown in FIG. 1 to facilitate discussion, it should be understood that any suitable number of work vehicles 110 (e.g., 1, 2, 3, 4, 5, 6, 7, 8, 9, 10, or more) and any suitable number of aerial vehicles 120 (e.g., 1, 2, 3, 4, 5, 6, 7, 8, 9, 10, or more) may be provided within the system 100. For example, in some embodiments, the system 100 may include one work vehicle 110 and at least two aerial vehicles 120. In some such cases, one aerial vehicle 120 may move with (e.g., move automatically with or be wirelessly tethered to) the work vehicle 110 to monitor and/or provide a view of the tool 115 and/or the area surrounding the work vehicle 110, while another aerial vehicle 120 may move separately from the work vehicle 110 or maintain a fixed position relative to the worksite to monitor and/or provide a different view, such as a relatively wider view of the worksite. In some embodiments, the system 100 may include multiple work vehicles 110 each having one or more designated aerial vehicles 120 that moves with the respective work vehicle 110 to monitor and/or provide a view of the area surrounding the respective work vehicle 110, for example. In some such cases, one or more additional aerial vehicles 120 may be provided to monitor and/or provide a different view, such as a relatively wider view of the worksite. In some embodiments, the system 100 may include multiple vehicles 110 and one aerial vehicle 120 may monitor and/or provide a wide view of the multiple work vehicles 110 within the worksite and/or may move between the various work vehicles 110. Although certain embodiments herein are described with reference to the aerial vehicle 120 to facilitate discussion, it should be understood that in some embodiments, the system 100 may additionally or alternatively include any of a variety of monitoring vehicles, including one or more surface vehicles, such as autonomous rovers, remote-controlled rovers, or manned rovers, for example. In some such cases, the surface vehicles may include the one or more sensors 121, which may obtain data as the monitoring vehicles travels across the field. The data may then be provided to the controller and/or used (e.g., alone or in combination with data provided from the one or more sensors 121 of the one or more aerial vehicles 120) in any of the various monitoring and mapping techniques disclosed herein. For example, data from the one or more sensors 121 attached to the one or more surface vehicles and data from the one or more sensors 121 of the one or more aerial vehicles 120 may be utilized to generate the map of the worksite. It should be understood that the work vehicle 110 may include the one or more sensors 121 that are configured to obtain data that may also be utilized in any of the various monitoring and mapping techniques.

Figure 2:
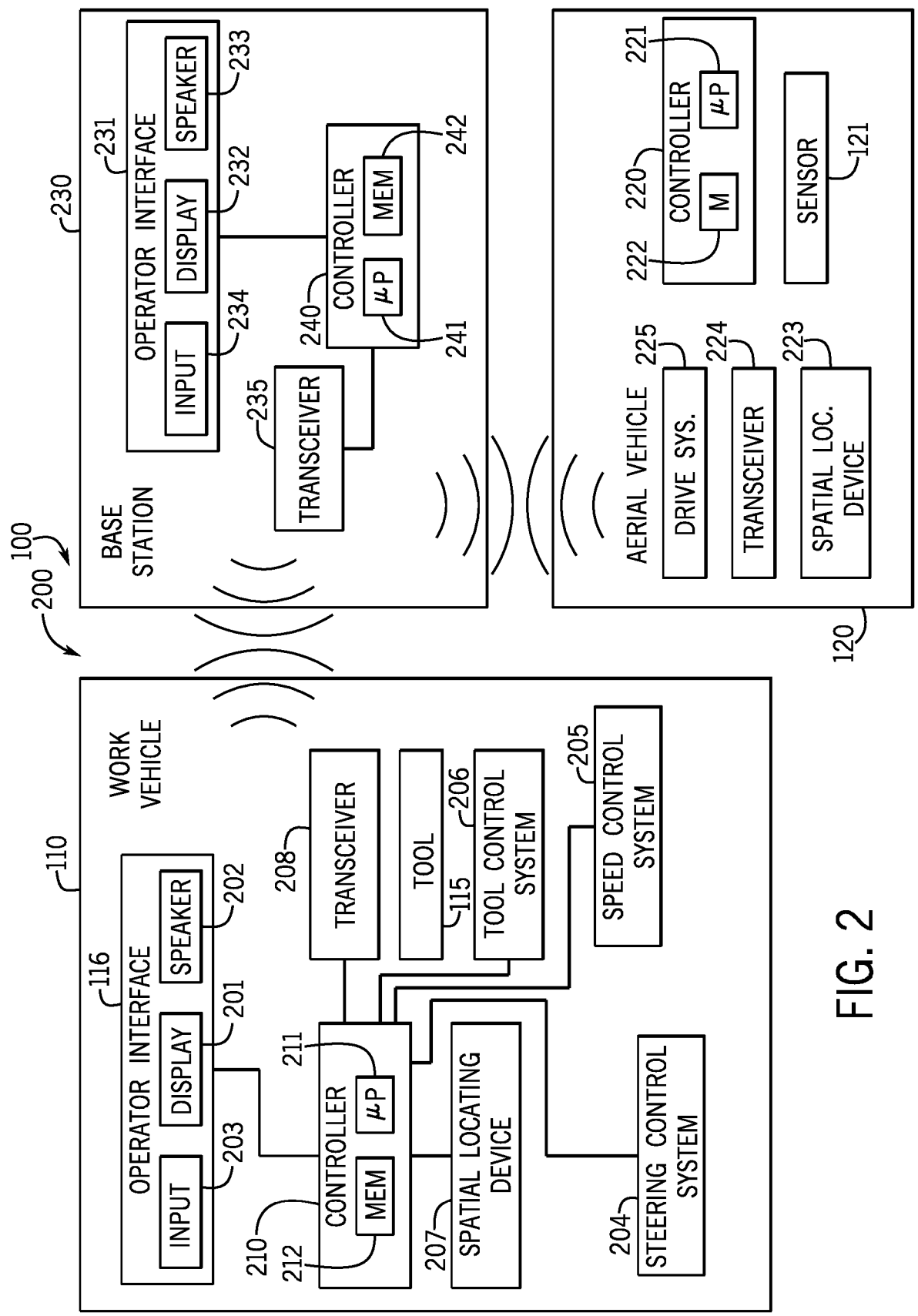
FIG. 2 is a block diagram of a control system configured to control operation of the work vehicle and the aerial vehicle of FIG. 1, in accordance with an embodiment of the present disclosure.

FIG. 2 is a block diagram of a control system 200 configured to control operation of the work vehicle 110 and the aerial vehicle 120 of FIG. 1, in accordance with an embodiment of the present disclosure. Various components of the control system 200 may be included or provided within (e.g., mounted to) the work vehicle 110 and the aerial vehicle 120. In the illustrated embodiment, the work vehicle 110 includes the operator interface 116, which includes various output devices and input devices, such as a display 201, a speaker 202, and an input 203 (e.g., button or switch), configured to provide information to and/or receive inputs from an operator of the work vehicle 110. For example, the operator interface 116 may be configured to present data obtained by the one or more sensors 121 of the aerial vehicle 120 to an operator (e.g., an image obtained by the one or more sensors 121) via the display 201. The operator interface 116 may also be configured to enable an operator to provide inputs (e.g., via the input 203 or virtual input on the display 201) to control certain functions of the work vehicle 110 (e.g., starting and stopping the work vehicle 110, etc.), the tool 115 attached to the work vehicle 110 (e.g., raising and lowering the tool 115, etc.), and/or the aerial vehicle 120 (e.g., moving a position of the aerial vehicle 120, adjusting a zoom level and/or a field of view provided by the aerial vehicle 120, operating the one or more sensors 121, etc.). In addition, the operator interface 116 (e.g., via the display 201 or the speaker 202) may be configured to provide an alarm (e.g., visual or audible alarm, such as a text message, light, beep or other sound, or the like), such as if the work vehicle 110 approaches a structure, such as a building or fence detected by the aerial vehicle 120, for example.

As shown, the work vehicle 110 includes a steering control system 204, a speed control system 205, a tool control system 206, a spatial locating system 207, and a transceiver 208. The work vehicle 110 includes a controller 210 (e.g., electronic controller or vehicle controller) having a processor 211 and a memory device 212, and the controller 210 is communicatively coupled to the spatial locating system 207, the steering control system 204, the speed control system 205, the tool control system 206, and the transceiver 208. The steering control system 204 may be configured to control a direction of movement of the work vehicle 110, the speed control system 205 may be configured to control a speed (e.g., ground speed) of the work vehicle 110, and the tool control system 206 may be configured to control operation of the tool 115 (e.g., attached to the work vehicle 110). The spatial locating system 207 may be configured to determine a position of the work vehicle 110. As will be appreciated, the spatial locating system 207 may include any suitable system configured to determine the position of the work vehicle 110, such as a global positioning system (GPS) or global navigation satellite system (GNSS), for example. In certain embodiments, the spatial locating system 207 may be configured to determine the position of the work vehicle 110 relative to a fixed point within the field (e.g., via a fixed radio transceiver). Accordingly, the spatial locating system 207 may be configured to determine the position of the work vehicle 110 relative to a fixed global coordinate system (e.g., via the GPS or GNSS) or a fixed local coordinate system.

In the illustrated embodiment, the aerial vehicle 120 includes the one or more sensors 121 and a controller 220 (e.g., electronic controller or aerial vehicle controller) having a processor 221 and a memory device 222. As shown, the controller 220 is communicatively coupled to a spatial locating system 223, a transceiver 224, and a drive system 225 of the aerial vehicle 120. The spatial locating system 223 may be configured to determine a position of the aerial vehicle 120, and the spatial locating system 223 may include any suitable system configured to determine the position of the aerial vehicle 120, including those discussed above with respect to the spatial locating system 207 of the work vehicle 110. The spatial location systems 207, 223 may enable determination (e.g., by a controller, such as the controller 210) or provide confirmation that the work vehicle 110 and/or the aerial vehicle 120 are in the desired position relative to one another and/or the worksite, for example. The drive system 225 (e.g., propulsion system) may include a motor, a propeller, or the like that enable the aerial vehicle 120 to lift off the ground, fly, hover, and/or change directions to move about the worksite.

As noted above, the one more sensors 121 of the aerial vehicle 120 may include an imaging system, such as a camera configured to obtain still and/or moving images (e.g., videos). In some embodiments, the one or more sensors 121 of the aerial vehicle 120 may include an acoustic sensor configured to emit and to detect acoustic waves (e.g., ultrasound waves) to facilitate detection of objects in the worksite, including underground objects (e.g., rocks). In some embodiments, the one or more sensors 121 of the aerial vehicle 120 may include an optical sensor (e.g., infrared sensor) configured to emit and to detect light (e.g., infrared light) to facilitate detection of objects in the worksite, including underground objects (e.g., underground water sources or leaks) and/or soil moisture content, for example. In some embodiments, the one or more sensors 121 may include a humidity sensor configured to monitor a humidity level, a temperature sensor configured to monitor an air temperature, and/or a wind speed sensor configured to monitor a wind speed about the aerial vehicle 120. The sensors 121 described herein are merely provided as examples to facilitate discussion and are not intended to be limiting. It should be understood that the one or more sensors 121 may include any of a variety of sensors (e.g., capacitance sensors, thermal sensors, electromagnetic sensors, etc.) configured to monitor and to generate signals indicative of various characteristics of the worksite, the air about the worksite, and/or the aerial vehicle 120, for example.

In the illustrated embodiment, the control system 200 includes a base station 230 (e.g., remote base station that may be physically separate from the work vehicle 110 and the aerial vehicle 120). As shown, the base station 230 includes an operator interface 231 having various output and input devices, such as a display 232, a speaker 233, and an input 234 (e.g., button or switch). In the illustrated embodiment, the base station 230 includes a transceiver 235 and a controller 240 (e.g., electronic controller or base station controller) having a processor 241 and a memory device 242.

The transceiver 208 included in the work vehicle 110, the transceiver 224 included in the aerial vehicle 120, and/or the transceiver 235 included in the base station 230 may be configured to establish a wireless communication link with one another. As will be appreciated, the transceivers 208, 224, 235 may operate at any suitable frequency range within the electromagnetic spectrum. For example, in certain embodiments, the transceivers 208, 224, 235 may broadcast and receive radio waves within a frequency range of about 1 GHz to about 10 GHz. In addition, the transceivers 208, 224, 235 may utilize any suitable communication protocol, such as a standard protocol (e.g., Wi-Fi, Bluetooth, mesh networking, etc.) or a proprietary protocol. Thus, the transceivers 208, 224, 235 may enable the transmission of data (e.g., the data obtained by the one or more sensors 121 of the aerial vehicle 120) and control signals (e.g., input via the inputs 203, 234) between the work vehicle 110, the aerial vehicle 120, and/or the base station 230.

In certain embodiments, the controllers 210, 220, 240 disclosed herein are electronic controllers having electrical circuitry configured to process signals, such as signals generated by the one or more sensors 121 of the aerial vehicle and/or control signals provided via inputs, such as the inputs 203, 234, for example. In the illustrated embodiment, the controllers 210, 220, 240 include respective processors 211, 221, 241 and memory devices 212, 222, 242. The controllers 210, 220, 240 may also include one or more storage devices and/or other suitable components. The processors 211, 221, 241 may be used to execute software. For example, the processor 211 of the controller 210 of the work vehicle 210 may be configured to receive signals from the one or more sensors 121 and to execute software to generate a map of the worksite based on the signals (e.g., a map with an image obtained from the one or more sensors 121 overlaid with other information, such as boundaries obtained via a prior land survey, work areas input by the operator, or the like). Moreover, the processors 211, 221, 241 may include multiple microprocessors, one or more "general-purpose" microprocessors, one or more special-purpose microprocessors, and/or one or more application specific integrated circuits (ASICS), or some combination thereof. For example, the processors 211, 221, 241 may include one or more reduced instruction set (RISC) processors.

The memory devices 212, 222, 242 may include a volatile memory, such as random access memory (RAM), and/or a nonvolatile memory, such as ROM. The memory devices 212, 222, 242 may store a variety of information and may be used for various purposes. For example, the memory devices 212, 222, 242 may store processor-executable instructions (e.g., firmware or software) for the processors 211, 221, 241 to execute, such as instructions for processing signals to generate the map of the worksite, controlling the aerial vehicle 120, and/or controlling the work vehicle 110. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., existing or previously generated field maps, predetermined utility lines, worksite boundaries obtained via a land survey, work areas within the worksite, building plans, characteristics of the work vehicle, etc.), instructions (e.g., software or firmware for generating the map of the worksite, controlling the aerial vehicle 120, controlling the work vehicle 110, etc.), and any other suitable data.

In operation, in some embodiments, the work vehicle 110 may be guided about the worksite and the tool 115 may be controlled to perform various work tasks via operator control of the joystick 114 and/or operator input via the operator interface 116 of the work vehicle 110. In certain embodiments, the aerial vehicle 120 may be linked (e.g., wirelessly tethered) to the work vehicle 110, and thus, may automatically move with the work vehicle 110. For example, the aerial vehicle 120 may be programmed to maintain or hover at a fixed position relative to a fixed reference point of the work vehicle 110 (e.g., a designated center point or coordinate axis of the work vehicle 110), such as a fixed position proximate to the attached tool 115 that enables the aerial vehicle 120 to monitor and/or to provide images of the tool 115 and/or the surface engaged by the tool 115 or a fixed position vertically above the work vehicle 110 that enables the aerial vehicle 120 to monitor and/or to provide a wide-perspective view (e.g., 360 degree view) about the work vehicle 110. In some embodiments, the aerial vehicle 120 may be programmed to maintain or hover at a fixed position relative to a fixed reference point of the worksite (e.g., the fixed global coordinate system or the fixed local coordinate system). In some embodiments, the fixed position may be preprogrammed and/or selected from several preprogrammed fixed positions (e.g., at manufacturing and/or by the operator prior to conducting a work task).

Additionally or alternatively, in some embodiments, the aerial vehicle 120 (e.g., the one or more sensors 121, the drive system 235, etc.) may be remotely controlled, such as via operator inputs at the operator interface 116 within the work vehicle 110 and/or via operator inputs at the operator interface 231 at the base station 230. For example, the operator may provide inputs that are communicated to the drive system 225 to adjust the position of the aerial vehicle 120. In some such cases, the operator may remotely control the aerial vehicle 120 to move to various desired locations about the work vehicle 110 and/or about the worksite. In some embodiments, the operator may control the aerial vehicle 120 to a desired position relative to the work vehicle 110 and/or relative to the worksite (e.g., the fixed global coordinate system or the local coordinate system) and then instruct the aerial vehicle 120 to maintain the desired position relative to the work vehicle 110 and/or relative to the worksite.

As discussed above, the one or more sensors 121 of the aerial vehicle 120 may be configured to obtain various data, and the data may be provided to the work vehicle 210 and/or the base station 230 (e.g., via the transceivers 208, 224, 235) for processing (e.g., by the controllers 210, 240) and/or output (e.g., via the operator interface 116, 231). For example, in some embodiments, the controller 210 of the work vehicle 110 and/or the controller 240 of the base station 230 may receive and process the data from the one or more sensors 121 of the aerial vehicle 120. For example, the controller 210 may be configured to generate a map and/or to update an existing map (e.g., a map stored in the memory device 212, such as a map obtained via satellite or during a prior monitoring session) of the worksite based on the data received from the one or more sensors 121. In some embodiments, the map may depict an image obtained by the one or more sensors 121 overlaid by other data, such as objects (e.g., underground rocks or water features) detected via the one or more sensors 121 (e.g., acoustic and/or optical sensor), and/or overlaid by information input by the operator and/or accessed from a memory device (e.g., the memory device 212), such as topography, designated work areas (e.g., dump areas, fill areas, dig areas, foundation areas or planned building footprint, work area for each work vehicle 110, etc.), utility lines (e.g., underground and above-ground utility lines), boundaries (e.g., from a land survey, etc.), agricultural crop yield maps, or the like. The substantially real-time and/or high-resolution image and/or map may enable the operator of the work vehicle 110 to work close to the various features within the worksite without damaging or interfering with such features, thereby enabling the operator to carry out work tasks more efficiently. The image obtained by the one or more sensors 121 of the aerial vehicle 120 may be processed and analyzed (e.g., to identify obstacles) by the controller 210 via any suitable machine vision technique, image processing technique, and/or object detection technique, such as color and/or gradient recognition, pattern recognition, template matching, feature extraction, database search and matching, object classification, image registration, filtering, edge detection, or the like.

In some embodiments, the controller 210 may be configured to generate an alarm (e.g., a visual or audible alarm provided via the operator interfaces 116, 231) based on the data received from the one or more sensors 121. For example, the controller 210 may generate an alarm if data received from the one or more sensors 121 indicates obstacles (e.g., new obstacles) that were previously unknown (e.g., not stored in the memory device or identified in existing maps) and/or if the work vehicle 110 approaches an obstacle identified based on the data received from the one or more sensors 121.

In some embodiments, the controller 210 may be configured to generate control signals to control the work vehicle 110, the aerial vehicle 120, or the like (e.g., to control the ground speed and/or steering of the work vehicle 110, to block movement of the tool 115 of the work vehicle 110, to move the aerial vehicle 120, to operate the one or more sensors 121 of the aerial vehicle 120) based on the data obtained by the one or more sensors 121 of the aerial vehicle 120. For example, the controller 210 may be configured to limit the ground speed and/or steering angle of the work vehicle 110 and/or block operation of the tool 115 of the work vehicle 110, if such operation would interfere with identified obstacles, cause the work vehicle 110 and/or the tool 115 to interact with an area outside of the designated work area (e.g., traveling and/or digging outside of the designated work area), or the like. The controller 210 may be configured to determine whether such operation would interference with identified obstacles may be based analysis of the commanded operation and the data from the one or more sensors 121 (e.g., via machine vision techniques, image processing techniques, and/or object detection techniques).

In some embodiments, the controller 210 may be configured to monitor progress of the work task (e.g., digging the trench, laying foundation, etc.) based on the data from the one or more sensors 121 (e.g., based on analysis of the images over time, which may be indicative of changes to work areas, such as percentage of trees cleared, percentage of foundation laid, or the like), to compare the progress to expected progress (e.g., based on predefined templates or schedules for tasks within the work area), and to provide an output (e.g., a text message on the display 201) indicative of the changes and/or whether the work task is on schedule, behind schedule, and/or ahead of schedule. Such processes may be particularly useful in large worksites with multiple work vehicles 110, as such information may enable an operator at one location to monitor and/or to keep track of the progress of multiple work tasks. It should be understood that the controller 240 of the base station 230 may be configured to process the data from the one or more sensors 121 of the aerial vehicle 120 and to provide outputs (e.g., maps, alarms, control signals, progress reports) in a similar manner. Furthermore, in some embodiments, the controller 240 of the base station 230 is configured to process the data from the one or more sensors 121 and to relay the data, the maps, the alarms, the control signals, and/or the progress reports to the controller 210 of the work vehicle 110, which may then provide such information to the operator of the work vehicle 110 via the operator interface 116. It should be understood that the system 100 may include any suitable number of work vehicles 110, aerial vehicles 120, and/or base stations 230. For example, one or more base stations 230 may be configured to communicate with (e.g., to provide data and/or control signals to and/or to receive data from) multiple work vehicles 110 and/or multiple aerial vehicles 120.

Figure 3:
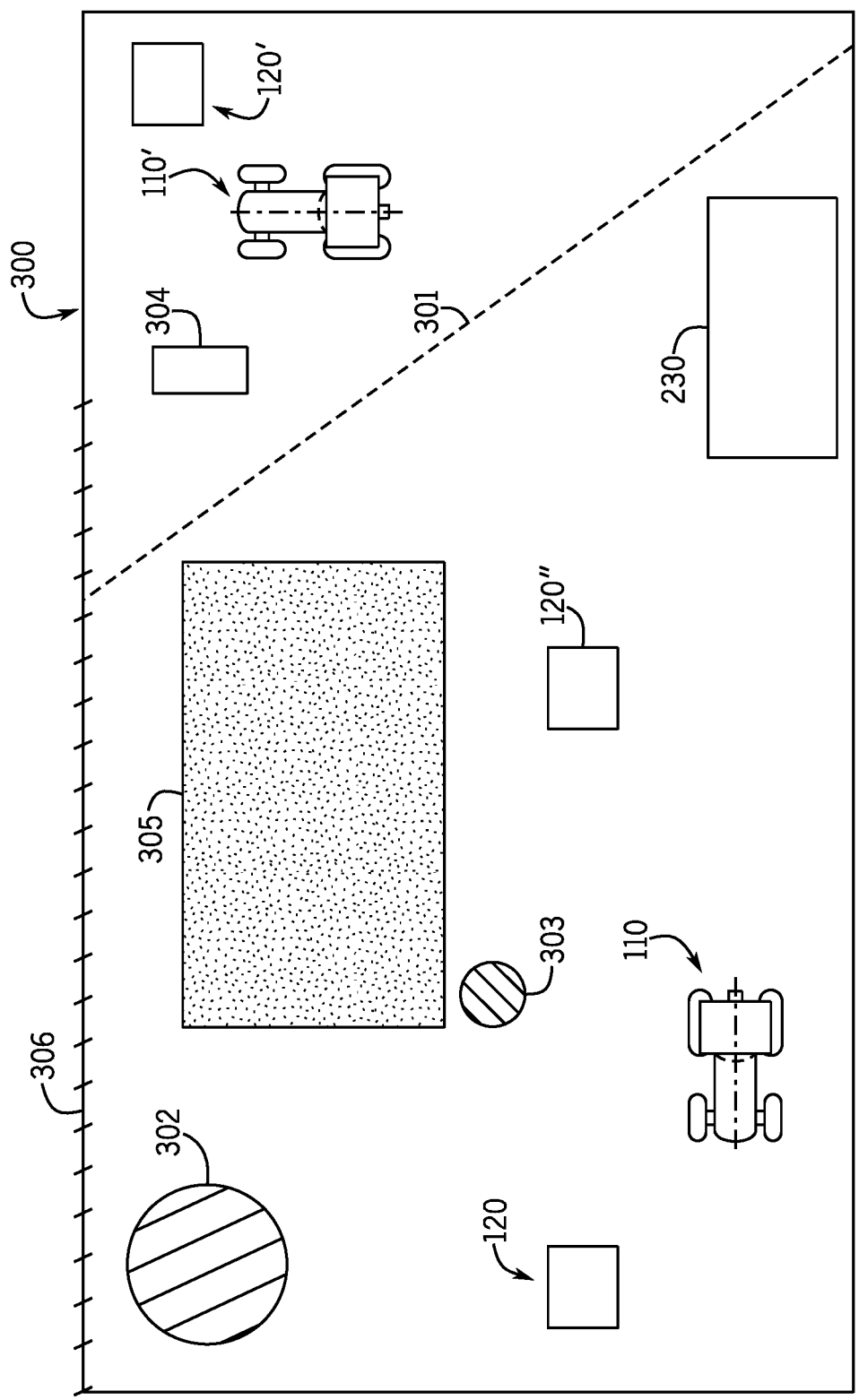
FIG. 3 is a schematic diagram of the work vehicle and the aerial vehicle of FIG. 1 within a worksite, in accordance with an embodiment of the present disclosure.

With the foregoing in mind, FIG. 3 is a schematic diagram of the work vehicle 110 and the aerial vehicle 120 of FIG. 1 within a worksite 300, in accordance with an embodiment of the present disclosure. As shown, the worksite 300 may include various obstacles and features, such as utility lines 301, water features 302 (e.g., ponds, pools, or the like), underground hazards 303 (e.g., large rocks or underground water features), trenches or holes 304, buildings 305, fences 306, other work vehicles 110', other aerial vehicles 120', 120", or any of a variety of other obstacles and features. The aerial vehicle 120 may be configured to obtain data indicative of the various obstacles and features of the worksite 300 and to provide the data to the work vehicle 110 and/or to the base station 230, in the manner discussed above with respect to FIG. 2. It should be understood that the other aerial vehicle 120' may similarly obtain data indicative of the various obstacles and features of the worksite 300 and provide the data to the other work vehicle 110' and/or the base station 230. Furthermore, in some embodiments, one or more additional aerial vehicles 120" may be provided to monitor the various obstacles and features of the worksite 300 and may provide data to the work vehicles 100, 110' and/or the base station 230. In some such cases, the aerial vehicle 120 may be configured to move with the work vehicle 110 (e.g., fixed position relative to the work vehicle 110 and/or controlled by the operator of the work vehicle 110), the other aerial vehicle 120' may be configured to move with the other work vehicle 110' (e.g., fixed position relative to the other work vehicle 110' and/or controlled by the operator of the other work vehicle 110'), and the additional aerial vehicle 120" may be in a fixed position relative to the worksite (e.g., based on the fixed global coordinate system or a fixed local coordinate system) and/or controlled by an operator, such as an operator at the base station 230 and/or an operator at a work vehicle, such as one or both work vehicles 110, 110'.

Figure 4:
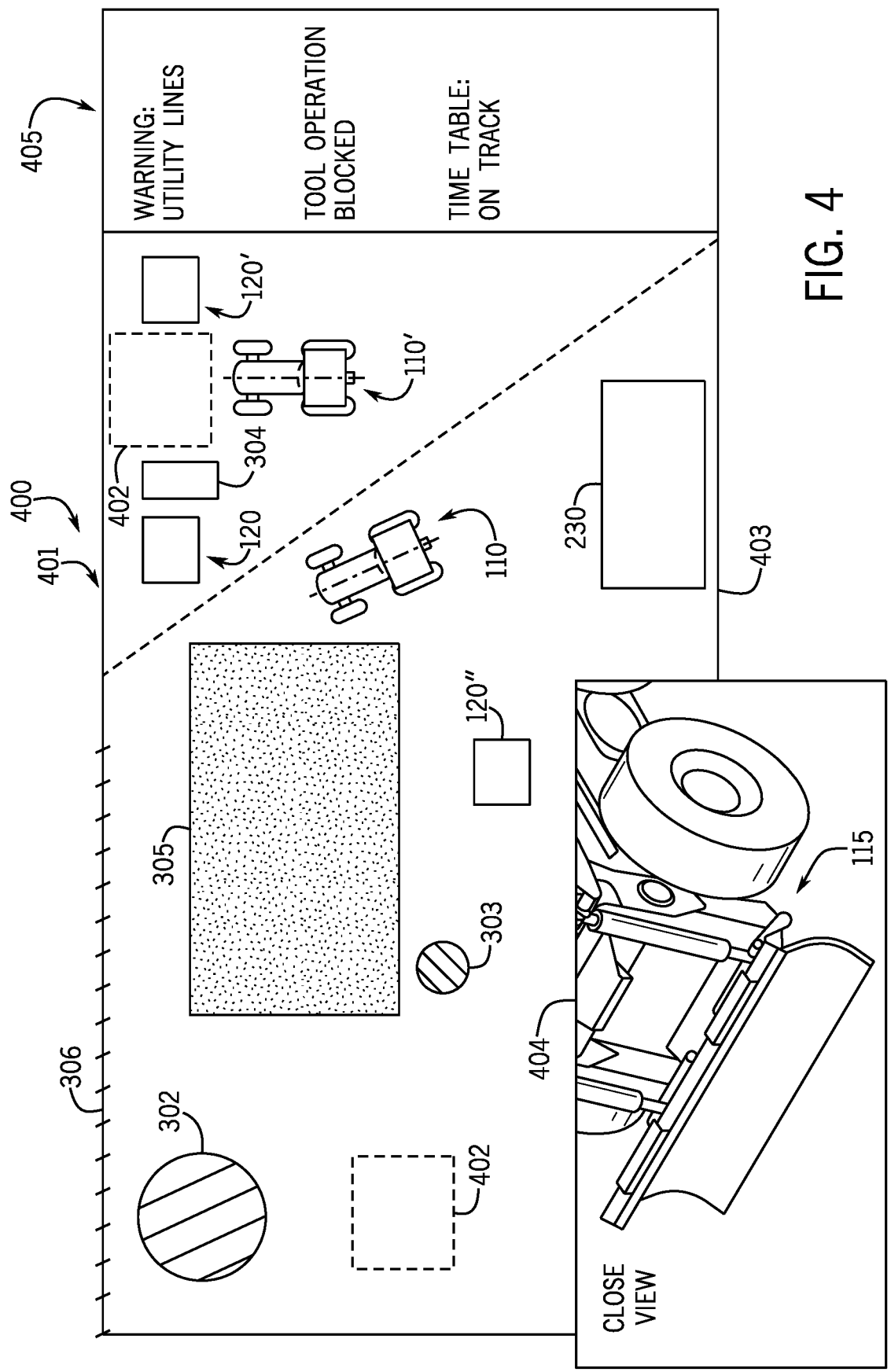
FIG. 4 is a schematic diagram of a display that may be provided within the work vehicle of FIG. 1, in accordance with an embodiment of the present disclosure.

FIG. 4 is a schematic diagram of a screen 400 that may be shown on a display, such as the display 201 within the work vehicle 100 and/or the display 232 at the base station 230, for example. As shown, the screen 400 may include a map 401 of the worksite that includes an image obtained by one or more aerial vehicles 120. The image may be obtained by controlling at least one of the one or more aerial vehicles 120 to a position that enables the one or more sensors 121 of the at least one aerial vehicle 120 to capture an image of the worksite or a portion of the worksite. For example, in the illustrated embodiment, the map 401 may include an image obtained by the additional aerial vehicle 120". The map 401 may identify (e.g., overlay) various obstacles and features of the worksite, such as the utility lines 301, the water features 302 (e.g., ponds, pools, or the like), the underground hazards 303 (e.g., large rocks or underground water features), the trenches or holes 304, the buildings 305, the fences 306, work vehicles 110, 110', aerial vehicles 120, 120', 120", or any of a variety of other obstacles and features. In some embodiments, the map 401 may identify other features of the worksite 300, such as designated work areas 402 (e.g., obtained from building plans) and/or boundaries (e.g., invisible boundaries obtained by land survey). The various obstacles and features may be identified based on data from the one or more sensors 121 of the aerial vehicles 120, may be accessed from a memory device (e.g., the memory device 212, 242), and/or may be input by the operator (e.g., via the input 203, 234). The identified obstacles and features may then be incorporated to overlay the image to generate the map 401 by a controller (e.g., the controller 210, 240) and output to the operator (e.g., via the display 201, 232).

In the illustrated embodiment, the screen 400 includes an additional map 404, which may include another image obtained from another one of the one or more aerial vehicles 120 or from the same aerial vehicle 120 at a different time and/or position. For example, in the illustrated embodiment, the map 404 includes an image obtained by the aerial vehicle 120 proximate to the work vehicle 110. As such, the image includes a close-up view of the tool 115 of the work vehicle 110 and the portion of the worksite surrounding the tool 115. It should be understood that the maps 401, 404 may be updated as the aerial vehicle 120 moves about the worksite 300, thereby providing substantially real-time images of the worksite 300. In the illustrated embodiment, the screen 400 also includes a portion 405 that provides various information, such as alarms (e.g., text messages) if the work vehicle 110 approaches an obstacle. As shown, the screen 400 may provide other information based on determinations and/or outputs of the controller 210, 240, such as an indication that operation of the tool 115 is blocked due to its position relative to an obstacle or feature of the worksite, progress reports (e.g., on schedule, behind schedule, ahead of schedule), or the like. It should be understood that the operator may be able to adjust the configuration of the screen 400 to show images obtained by a different aerial vehicle 120, images obtained at different times, and/or images of different portions of the worksite 300, to overlay different information (e.g., topography or boundaries), or the like.

Figure 5:
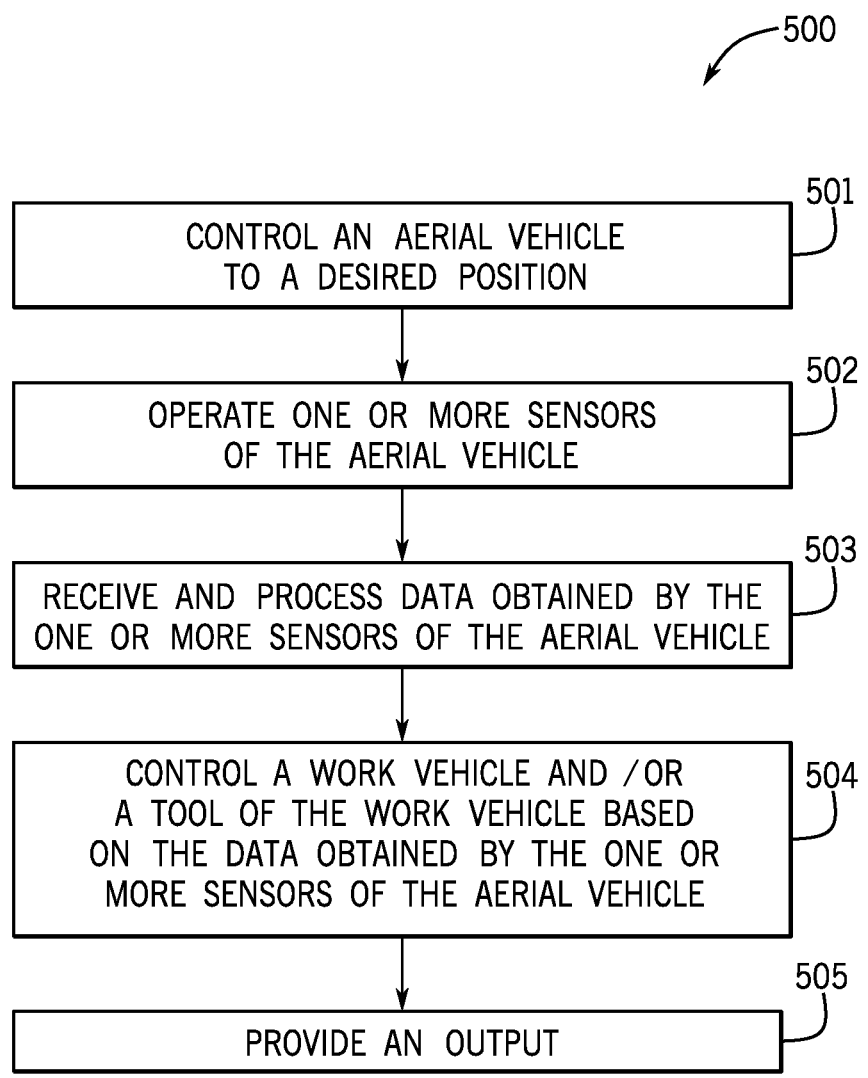
FIG. 5 is a flow diagram of a method of operating the system having the work vehicle and the aerial vehicle of FIG. 1, in accordance with an embodiment of the present disclosure.

FIG. 5 is a flow diagram of an embodiment of a method 500 of operating the system 100 having the work vehicle 110 and the aerial vehicle 120 of FIG. 1. The method 500 includes various steps represented by blocks. It should be noted that the method 500 may be performed as an automated procedure by a system, such as the control system 200. Although the flow chart illustrates the steps in a certain sequence, it should be understood that the steps may be performed in any suitable order, certain steps may be omitted, and certain steps may be carried out simultaneously, where appropriate. Further, certain steps or portions of the method 500 may be performed by separate devices. For example, a first portion of the method may be performed by the controller 210, while a second portion of the method may be performed by the controller 240. It should be understood that the various features disclosed above with respect to FIGS. 1-4 may be incorporated and/or utilized with the steps of the method 500. While the method 500 is described with reference to the aerial vehicle 120 to facilitate discussion, it should be understood that the steps of the method 500 may be applied to various types of monitoring vehicles, such as surface vehicles.

In step 501, a controller (e.g., the controller 210, 220, 230) may control the aerial vehicle 120 to a desired position. For example, in some embodiments, the aerial vehicle 120 may be controlled based on an operator input provided at the input 203 of the work vehicle 110, based on an operator input provided at the input 234 of the base station 230, and/or autonomously based on preprogrammed instructions stored on the aerial vehicle 120. In step 502, a controller may operate the one or more sensors 121 of the aerial vehicle 120 to obtain data indicative of various features and/or obstacles within a worksite. In step 503, a controller may receive and process the data from the one or more sensors 121 of the aerial vehicle 120. For example, the controller may process the data to generate a map (e.g., the map 401, 404). As discussed above, in some embodiments, the controller may generate the map by overlaying various features (e.g., underground features) detected by the one or more sensors 121 and/or information (e.g., topography, boundaries, designed work areas, water features, or the like) on an image obtained by the one or more sensors 121 of the aerial vehicle 120. In step 504, the controller may control the work vehicle 110 and/or the tool 115 of the work vehicle 110 based on the data obtained by the one or more sensors 121 (e.g., based on the image and/or the map). For example, the controller may automatically block movement of the tool 115 if the work vehicle 110 is determined to be outside of the designated work area (e.g., based on the map) and/or if the commanded movement of the tool 115 would interfere with a feature detected by the one or more sensors 121. In step 505, the controller may provide an output, such as the map generated at step 503, an alarm, a control signal, and/or another indication, such as an indication of progress at the worksite, as discussed above.

While the work vehicle 110 and the aerial vehicle 120 are shown operating in conjunction with one another, in some embodiments, the aerial vehicle 120 may be used by itself, for example, to provide for or update an image of the worksite. While the aerial vehicle 120 is shown as a self-propelled vehicle that is physically separate from the work vehicle 110, it should be understood that the aerial vehicle 120 may be physically attached to the work vehicle 110 (e.g., mounted on a pole vertically above the work vehicle 110). While the illustrated work vehicle 110 is controlled locally by an operator supported within the work vehicle 110, it should be understood that the work vehicle 110 may be a remotely controlled (e.g., by an operator located at the base station 230) and/or autonomously controlled (e.g., based on preprogrammed instructions).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
  a first aerial vehicle comprising one or more sensors configured to obtain real-time images of a worksite; and
  a controller configured to:
    receive the real-time images of the worksite;
    generate and update a map of the worksite by overlaying information related to the worksite on the real-time images, wherein the information comprises a location of utilities at the worksite, a boundary of the worksite, a designated work area of the worksite, or a combination thereof;
    display the map via a display;
    determine a location of a feature of the worksite based on the map; and limit a steering angle of a work vehicle traveling across the worksite upon a determination that adjustment of the steering angle causes the work vehicle to interfere with the feature.

2. The system of claim 1, wherein the controller is located within a work vehicle configured to carry out a work task at the worksite.

3. The system of claim 2, wherein the map is utilized by the controller to automatically limit a ground speed of the work vehicle, the steering angle of the work vehicle, or both.

4. The system of claim 2, wherein the controller is further configured to block movement of a tool attached to the work vehicle based on the map.

5. The system of claim 1, wherein the first aerial vehicle is configured to automatically move with the work vehicle.

6. The system of claim 5, further comprising a second aerial vehicle that is configured to move independently of the work vehicle.

7. The system of claim 1, wherein the first aerial vehicle is configured to be remotely controlled to change positions via an operator input at an operator interface of the work vehicle.

8. The system of claim 1, wherein the controller is further configured to generate a progress report for the worksite based on the real-time images.

9. The system of claim 1, wherein the controller is positioned at a base station that is physically separate from the first aerial vehicle and from the work vehicle.

10. The system of claim 1, further comprising one or more additional sensors coupled to the first aerial vehicle, wherein the one or more additional sensors comprise an acoustic sensor, an infrared sensor, or both, and the information comprises underground features detected via the one or more additional sensors as the first aerial vehicle traverses the worksite.

11. A non-transitory computer-readable medium comprising instructions that when executed by a processor cause the processor to:
receive real-time images of a worksite from one or more sensors of an aerial monitoring vehicle;
determine a position of a tool of a work vehicle relative to a feature of the worksite based on the real-time images;
output a command to move the tool to an updated position;
monitor, based on the real-time images received from the one or more sensors of the aerial monitoring vehicle, movement of the tool toward the updated position; and
block the movement of the tool upon a determination that the movement of the tool interferes with the feature of the worksite.

12. The non-transitory computer-readable medium of claim 11, further comprising instructions that when executed by the processor cause the processor further to access information from a memory device and to generate a map of the worksite based on the information and the real-time images.

13. The non-transitory computer-readable medium of claim 12, further comprising instructions that when executed by the processor cause the processor further to display the map on a display of the work vehicle.

14. The non-transitory computer-readable medium of claim 12, wherein the information comprises a location of utilities at the worksite, a boundary of the worksite, a designated work area of the worksite, or a combination thereof, and the map comprises the real-time images overlaid with the information.

15. A system, comprising:
an aerial vehicle comprising one or more sensors and configured to follow a work vehicle throughout a worksite, wherein the one or more sensors are configured to obtain real-time images of the work vehicle and of the worksite surrounding the work vehicle as the work vehicle traverses the worksite; and
a controller configured to:
receive the real-time images of the work vehicle and the worksite;
generate and update a map of the worksite by overlaying information related to the worksite on the real-time images, wherein the information comprises a location of utilities at the worksite, a boundary of the worksite, a designated work area of the worksite, or a combination thereof;
display the map via a display;
determine a position of a tool of the work vehicle relative to a feature of the worksite based on the real-time images;
output a command to adjust the position of the tool to an updated position;
monitor movement of the tool toward the updated position via the real-time images; and
block the movement of the tool upon a determination that the movement of the tool interferes with the feature.

16. The system of claim 15, wherein the one or more sensors comprise an acoustic sensor, an infrared sensor, or both, wherein the information further comprises underground features located near the work vehicle, wherein the underground features are detected by the one or more sensors as the aerial vehicle follows the work vehicle, and wherein the controller is further configured to receive the information from the aerial vehicle.

17. The system of claim 15, wherein the information further comprises a position of the aerial vehicle relative to a position of the work vehicle.

18. The system of claim 15, wherein the controller is further configured to determine a location of a feature of the worksite based on the map and to limit a steering angle of the work vehicle upon a determination that adjustment of the steering angle causes the work vehicle to interfere with the feature.

* * * * *